United States Patent
Paradise (10) Patent No.: US 9,217,372 B2
(45) Date of Patent: Dec. 22, 2015

(54) FLUID FLOW CONTROL DEVICE AND METHOD

(75) Inventor: Bruce Paradise, Avon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1003 days.

(21) Appl. No.: 13/357,803

(22) Filed: Jan. 25, 2012

(65) Prior Publication Data

US 2013/0186098 A1  Jul. 25, 2013

(51) Int. Cl.
*F02C 7/232* (2006.01)

(52) U.S. Cl.
CPC ............ *F02C 7/232* (2013.01); *Y10T 137/8242* (2015.04); *Y10T 137/8659* (2015.04); *Y10T 137/8667* (2015.04)

(58) Field of Classification Search
CPC ........... F02C 7/232; F16K 1/38; F16K 1/385; F16K 11/065; F16K 11/07; F16K 27/04; F16K 27/041; F16K 27/047
USPC ............................. 251/124; 137/869, 625.48
See application file for complete search history.

(56) References Cited

U.S. PATENT DOCUMENTS

| | | | |
|---|---|---|---|
| 1,767,958 A * | 6/1930 | Berg | 137/172 |
| 3,942,553 A * | 3/1976 | Gallatin | 137/599.07 |
| 5,368,273 A | 11/1994 | Dante | |
| 6,050,081 A * | 4/2000 | Jansen et al. | 60/39.094 |
| 6,783,108 B2 | 8/2004 | Jansen | |
| 7,137,612 B2 | 11/2006 | Baca | |
| 7,251,925 B2 | 8/2007 | Paradise | |
| 7,874,315 B2 * | 1/2011 | Jansen | 137/637.1 |
| 2008/0308163 A1 * | 12/2008 | Larsen | 137/625.48 |

* cited by examiner

*Primary Examiner* — Andrew Nguyen
(74) *Attorney, Agent, or Firm* — Kinney & Lange, P.A.

(57) ABSTRACT

A fluid flow control system includes a fluid inlet, a central chamber, a first nozzle extending from a first side of the central chamber and comprising a first throat, a second nozzle extending from a second side of the central chamber opposite the first side and comprising a second throat, and a flow control shuttle. The flow control shuttle includes a first needle having a first tapered portion positioned within the first throat for controlling flow through the first nozzle and a second needle having a second tapered portion positioned within the second throat for controlling flow through the second nozzle.

18 Claims, 5 Drawing Sheets

FLUID FLOW CONTROL DEVICE AND METHOD

BACKGROUND

Aircraft fuel metering systems provide the proper amount of fuel to an engine depending on engine and flight conditions (takeoff, cruise, descent, etc.). Current fuel metering systems calculate the amount of fuel needed by the engine and deliver the prescribed amount to the engine where it is combusted. To accommodate the range of fuel delivery, fuel metering systems typically contain a fuel pump, a metering valve for controlling the amount of fuel sent to the engine and a separate differential pressure relief valve for allowing fuel to bypass the engine and ensure that the overall pressure in the fuel metering system is within specifications.

The metering valve and the differential pressure relief valve work together to prevent flow fluctuations. The differential pressure relief valve maintains a precise and nominally constant pressure drop across the metering valve. Thus, the differential pressure relief valve is opened to varying degrees based on the burn rate (i.e. the amount of fuel flowing through the metering valve and sent to the engine). When the metering valve is delivering a large amount of fuel (e.g., takeoff), little fuel needs to flow through the differential pressure relief valve to the bypass. Conversely, when only a small amount of fuel is delivered through the metering valve (e.g., descent), a large amount of fuel needs to flow through the differential pressure relief valve to prevent pressure buildup within the fuel metering system. Wide variation in the amount of bypass flow can be required for a given burn rate. Part of the variation is due to engine design; the fuel pump normally delivers fuel to the fuel metering system based on the engine burn rate. Variation is also due to differences in pumping pressure between new pumps and old, worn or deficient pumps. However, conventional differential pressure relief valves are designed to provide only one pressure solution for a prescribed burn rate. This results in imperfect control of the pressure drop across the metering valve. The pressure relief valve is tasked with providing a "perfect" solution to maintain pressure within the fuel metering system, but based on the number of variables affecting flow through the system, it attempts to provide the perfect solution essentially using a one-size-fits-many approach, ultimately reducing the accuracy of the fuel metering system because the "constant" differential pressure drifts up and down with engine operating conditions.

SUMMARY

A fluid flow control system includes a fluid inlet, a central chamber, a first nozzle extending from a first side of the central chamber and comprising a first throat, a second nozzle extending from a second side of the central chamber opposite the first side and comprising a second throat, and a flow control shuttle. The flow control shuttle includes a first needle having a first tapered portion positioned within the first throat for controlling flow through the first nozzle and a second needle having a second tapered portion positioned within the second throat for controlling flow through the second nozzle.

A fuel metering system includes a fuel inlet, a central chamber, a first critical flow nozzle extending from a fuel delivery side of the central chamber and having a first throat, a second critical flow nozzle extending from a bypass side of the central chamber opposite the fuel delivery side and having a second throat, and a flow control device. The flow control device includes a first needle having first tapered portion for modifying flow through the first nozzle and a second needle having a second tapered portion for simultaneously modifying flow through the second nozzle.

A flow control device includes a first needle with a first tapered portion slidably positioned within a first nozzle and a second needle with a second tapered portion slidably positioned within a second nozzle. A method for metering flow of fuel to an engine using the flow control device includes sensing a fuel back pressure, sensing a fuel temperature, sensing a position of the first needle of the flow control device with respect to the first nozzle and positioning the flow control device. The flow control device is positioned so that the first tapered portion is located within the first nozzle to define a fuel flow area and the second tapered portion is simultaneously located within the second nozzle to define a bypass fuel flow.

DETAILED DESCRIPTION

A fluid flow control system provides a flow path for engine fuel and a flow path for bypass fuel using a single control mechanism, a flow control shuttle. The flow control shuttle simultaneously modifies the fluid flow of fuel sent to the engine for combustion and of a fuel bypass. The fluid flow control system not only reduces the complexity of a fuel metering system, but also improves the accuracy because it eliminates a pressure relief valve that can only be controlled imperfectly.

Figure 1:
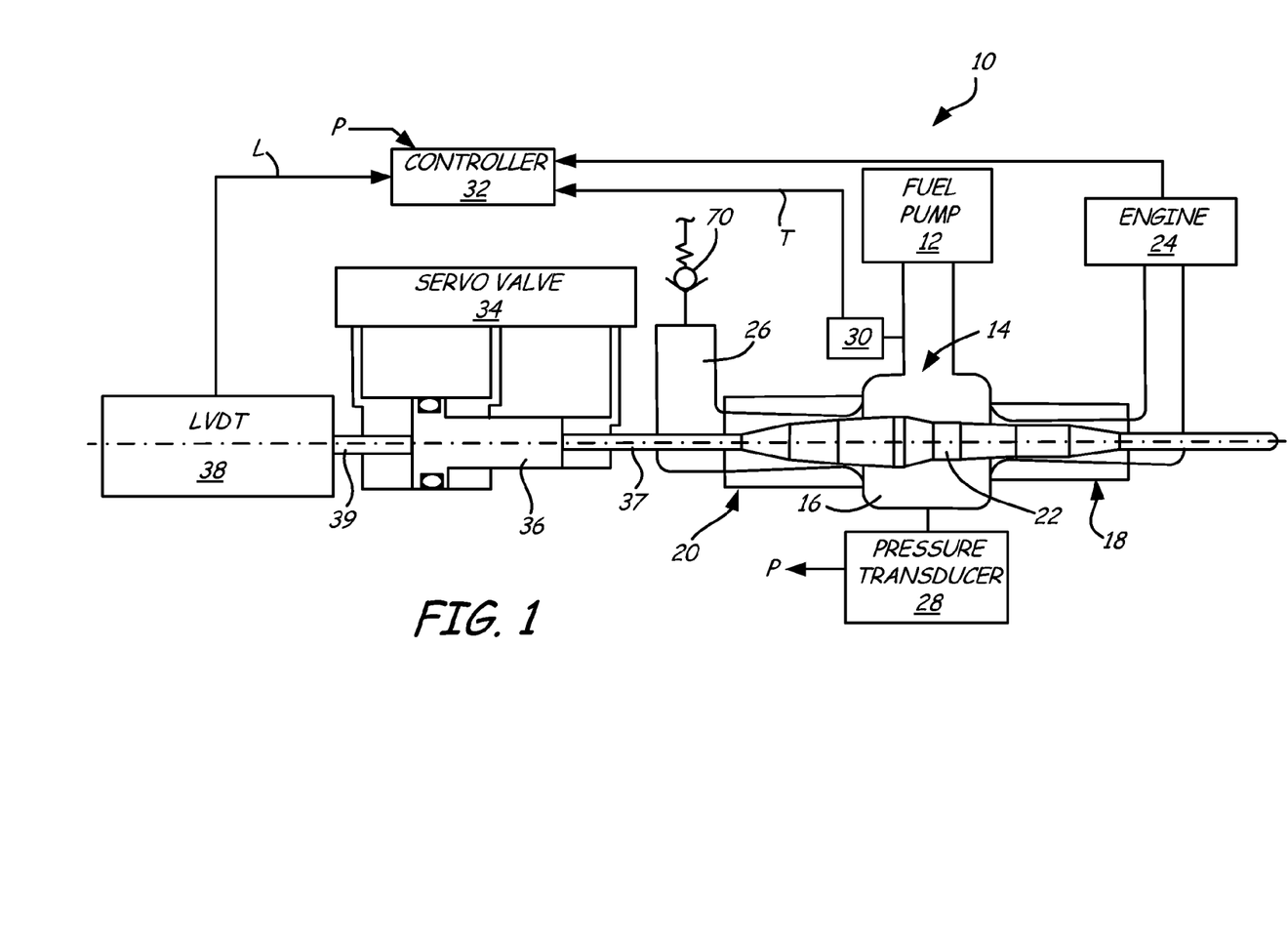
FIG. 1 is a simplified schematic of one embodiment of a fuel flow control system.

The fluid flow control system described herein can be used to regulate the flow of gases or liquids, such as fuel for the combustors of gas turbine engines. FIG. 1 illustrates a view of one embodiment of a fluid flow control system. Fuel flow control system 10 includes fuel pump 12, fuel inlet 14, central chamber 16, first nozzle 18, second nozzle 20 and flow control device (shuttle) 22. Fuel pump 12 is configured to deliver fuel to central chamber 16 via fuel inlet 14. The fuel pumped by fuel pump 12 is delivered to the pump from a fuel tank or another fuel source. Fuel pump 12 delivers fuel to central chamber 16 at a prescribed flow and within a prescribed pressure range. The prescribed flow and pressure range depend on engine conditions and the engine burn rate. Fuel flows into central chamber 16 through fuel inlet 14 so that the back pressure across fuel inlet 14 is generally between about 200 psi and about 1500 psi. Fuel entering central chamber 16 of fuel flow control system 10 through fuel inlet 14 exits through one of two routes. Fuel can exit central chamber 16 by passing through first nozzle 18. Fuel passing through first nozzle 18 continues to engine system 24 where it is combusted. Fuel that does not exit central chamber 16 through first nozzle 18 passes through second nozzle 20. Fuel passing through second nozzle 20 continues to fuel bypass 26. Fuel bypass 26 directs fuel back to a fuel tank or to fuel pump 12 where it can be redelivered to fuel flow control system 10, used as a heat sink in a heat exchanger, etc. Fuel flow control system 10 can also include pressure transducer 28 and temperature sensor 30, which monitor the pressure and temperature, respectively, of the fuel within central chamber 16. Fuel flow control system 10 can also include controller 32, servo valve 34, piston 36 and linear variable differential transformer (LVDT) 38. As described in greater detail below, flow control device 22 is used to control how much fuel is delivered through first nozzle 18 and, consequently, controls how much fuel passes through second nozzle 20.

Figure 2:
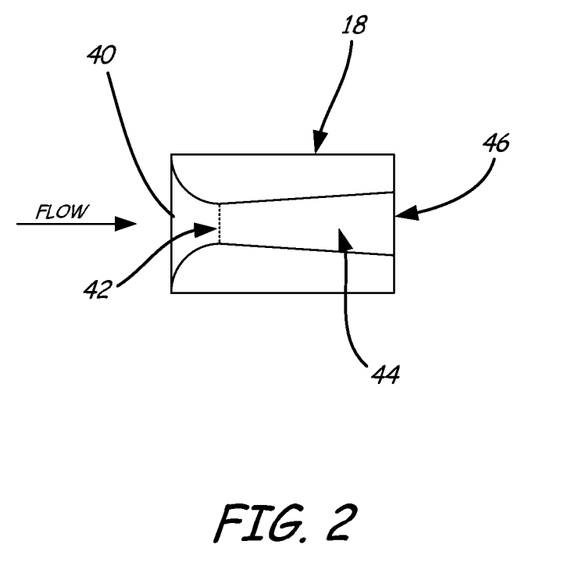
FIG. 2 is an axial cross-section view of a nozzle.

Flow control device 22 and first nozzle 18 control the flow of fuel from central chamber 16 to engine system 24. FIG. 2 shows a cross-section view of one embodiment of first nozzle 18 (without flow control device 22) along the flow axis. As shown in FIG. 2, first nozzle 18 is a Venturi nozzle. The Venturi effect is the reduction in fluid pressure that results when a fluid flows through a constricted section of pipe. First nozzle 18 is a tube-like passage having an inner diameter that varies along the axis of flow. First nozzle 18 includes converging nozzle entrance 40, minimum diameter throat section (first throat) 42, diverging pressure recovery zone 44 and nozzle exit 46. The inner diameters of first nozzle 18 determine effective flow areas along first nozzle 18. As shown in FIG. 2, the inner diameter of first nozzle 18 is larger at nozzle entrance 40 and nozzle exit 46 than at first throat 42. The inner diameter of first nozzle 18 is smallest at first throat 42. Between first throat 42 and nozzle exit 46 the inner diameter of first nozzle 18 expands. Pressure recovery zone 44 is located between first throat 42 and nozzle outlet 46.

Figure 3:
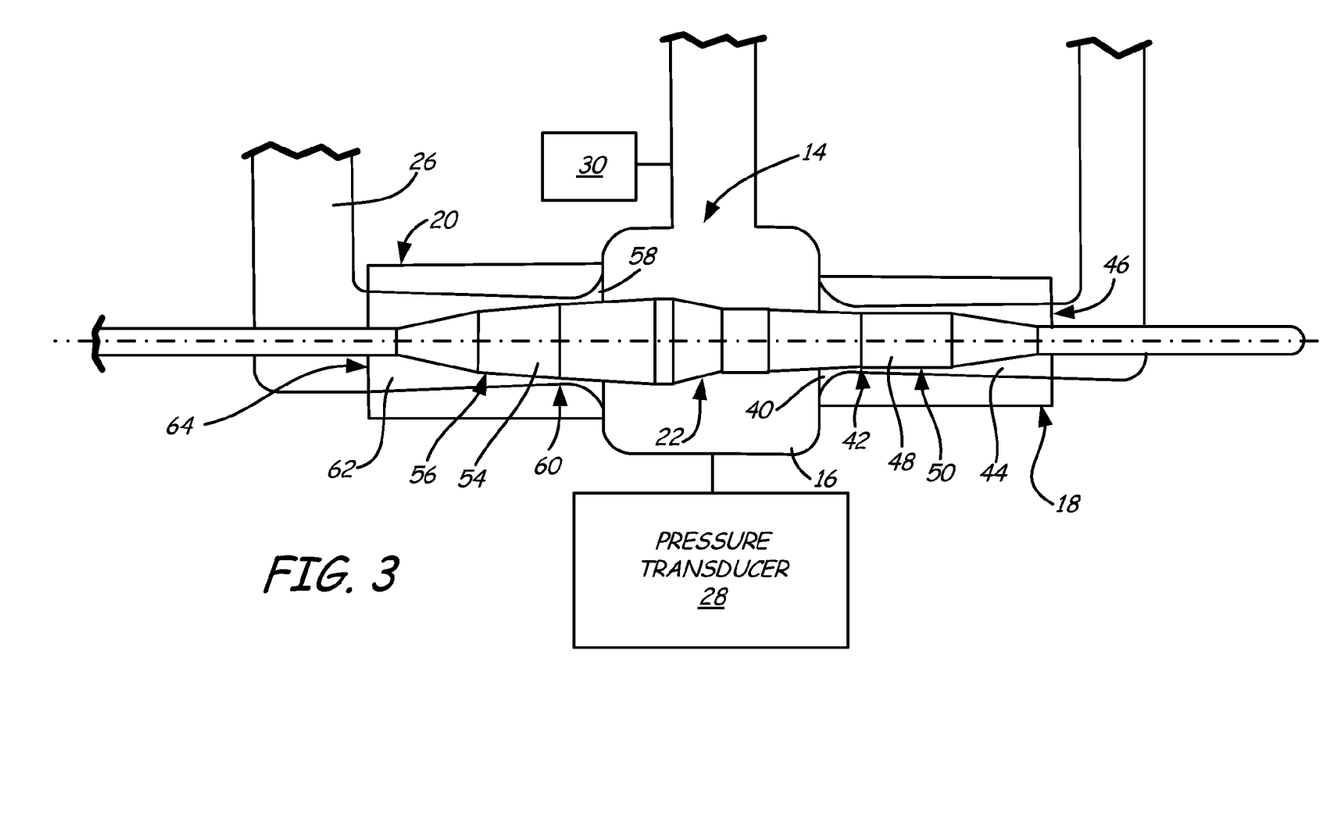
FIG. 3 shows a central chamber and nozzles of the fuel flow control system.

The effective flow area of first nozzle 18 is modified by flow control device 22 as shown in FIGS. 1 and 3. Flow control device 22 includes first needle 48, which is axially aligned with and extends into nozzle entrance 40 and first throat 42 of first nozzle 18. First needle 48 includes first elongated tapered portion 50. Flow control device 22 further includes tubular body 52 and second needle 54, which is axially aligned with and extends into second nozzle 20 (best shown in FIG. 3). Second needle 54 includes second elongated tapered portion 56. Flow control device 22 is axially, reciprocally shiftable within central chamber 16. Flow control device 22 is supported by journals (not shown) and can slide back and forth through central chamber 16, first nozzle 18 and second nozzle 20. When first needle 48 is moved to the right, second needle 54 also moves to the right and vice versa.

As noted above, the inner diameter of first nozzle 18 determines an effective flow area at each axial location along first nozzle 18. The overall flow through first nozzle 18 is partially dependent upon the smallest effective flow area within first nozzle 18 (i.e. the smallest constriction). In general, the smallest effective flow area within first nozzle 18 will be between nozzle entrance 40 and throat section 42, depending on the position of first needle 48 of flow control device 22. First needle 48 is positioned within first nozzle 18 to modify and define the effective flow areas of the nozzle. As it contains first tapered portion 50, first needle 48 of flow control needle 22 has varying radii along its longitudinal axis. For instance, as shown in FIG. 3, a central portion of first needle 48 near tubular body 52 has a larger radius than a portion of first needle 48 distal from tubular body 52. By adjusting the position of first needle 48 of flow control needle 22 within first nozzle 18, the degree of constriction can be modified. Flow constriction can be minimized by positioning first needle 48 within first nozzle 18 so that the radius of first needle 48 positioned at the smallest effective flow area is small (i.e. the small diameter tip of first needle 48 is located near first throat 42). Conversely, constriction can be maximized by positioning first needle 48 within first nozzle 18 so that the radius of first needle 48 positioned at the smallest effective flow area is large (i.e. the larger diameter portion of first needle 48 near tubular body 52 is located near first throat 42). By adjusting the positioning of first needle 48 within first nozzle 18, the degree of flow constriction and the effective flow area can be modified to meter the flow of fuel through first nozzle 18 and to engine system 24.

Flow control device 22 and second nozzle 20 control the flow of fuel from central chamber 16 to fuel bypass 26. Similar to first nozzle 18, the inner diameter of second nozzle 20 determines an effective flow area at each axial location along second nozzle 20, and the overall flow through second nozzle 20 is partially dependent upon the smallest effective flow area within second nozzle 20. Like first nozzle 18, second nozzle 20 is a tube-like passage having an inner diameter that varies along the axis of flow. As shown in FIG. 3, second nozzle 20 includes converging nozzle entrance 58, minimum diameter throat section (second throat) 60, diverging pressure recovery zone 62 and nozzle exit 64. Second needle 54 of flow control device 22 is positioned within second nozzle 20 to modify the effective flow areas of the nozzle. As it contains second tapered portion 56, second needle 54 of flow control device 22 has varying radii along its longitudinal axis. By adjusting the position of second needle 54 of flow control device 22 within second nozzle 20, the degree of constriction can be modified. Flow constriction can be minimized or maximized in the same way as first nozzle 18.

In exemplary embodiments, flow control device 22 is a one-piece assembly as shown in FIG. 3. First needle 48 engages with and is positioned in first nozzle 18 and second needle 54 engages with and is positioned in second nozzle 20 simultaneously. First needle 48 and second needle 54 of flow control device 22 can have the same length or different lengths. First needle 48 and second needle 54 can have generally different radii along the longitudinal axis of flow control device 22 as shown in FIG. 3 (i.e. second needle 54 generally has larger radii than first needle 48). First tapered portion 50 and second tapered portion 56 can also have the same or different taper profiles (i.e. the degree or angle of the taper).

As flow control device 22 engages with both first nozzle 18 and second nozzle 20 simultaneously, adjustment to the effective flow area of one nozzle can change the effective flow area of the other nozzle depending on the taper profiles of first needle 48 and second needle 54. For example, to increase the flow of fuel delivered to engine system 24, flow control device 22 is moved to the left (according to the view shown in FIG. 4). When flow control device 22 is moved to the left, a narrower portion of first needle 48 is positioned within first throat 42, increasing the effective flow area of first nozzle 18. At the same time, second needle 54 is also moved to the left, causing a wider portion of second needle 54 to be positioned within second throat 60, decreasing the effective flow area of second nozzle 20 and increasing the pressure within central chamber 16. In similar fashion, moving flow control device 22 to the right decreases flow through first nozzle 18 and increases flow through second nozzle 20 and decreases the pressure within central chamber 16. Thus, moving flow control device 22 away from a nozzle increases flow through that nozzle while reducing flow through the other nozzle. The fuel flow is the result of two gain effects, pressure increase with second nozzle 20 flow area decrease and pressure decrease with nozzle 18 flow area increase. In this way flow control device 22 converges on the desired positional solution that satisfies the pressure and area solution.

In exemplary embodiments, controller 32 adjusts the position of flow control needle 22 based on information received by pressure transducer 28, temperature sensor 30 and linear variable differential transformer 38. Fuel delivered by fuel pump 12 flows into central chamber 16 through fuel inlet 14. Fuel is generally delivered to central chamber 16 at a prescribed flow rate based on engine rotational speed (secondary shaft speed=N2). Pressure transducer 28 senses pressure (P) within central chamber 16, which is the same as the pressure at nozzle entrance 40 of first nozzle 18 and at nozzle entrance 58 of second nozzle 20. Temperature sensor 30 senses the temperature (T) of the fuel delivered to central chamber 16. Temperature sensor 30 can be located in central chamber 16 or near fuel inlet 14 as shown in FIGS. 1 and 3. Linear variable differential transformer 38 senses the linear displacement (location L) of flow control device 22 within central chamber 16.

In exemplary embodiments, controller 32 is an electronic engine controller (EEC) and determines the amount of burn flow needed to maintain the flight condition desired by the pilot. Controller 32 also receives information from pressure transducer 28 (P), temperature sensor 30 (T) and needle position (L) from LVDT 38. Based on the fuel temperature, the pressure in central chamber 16 and the amount of fuel required by engine system, controller 32 modifies the effective flow of first nozzle 18. Based on the taper profile of first needle 48, controller 32 commands flow control device 22 to locate to a position that provides for flow of the fuel necessary for present engine conditions. The required fuel passes through first nozzle 18 and the remaining fuel is diverted to second nozzle 20 where it continues to fuel bypass 26. The pressure in central chamber 16 is altered up or down depending on the direction the flow control device 22 is moved.

When the fuel flow command increases and the fuel pressure and temperature initially remain constant, controller 32 instructs flow control device 22 to move to the left (in the configuration shown in FIGS. 1 and 3). Moving flow control device 22 to the left increases the flow of fuel through first nozzle 18 in two ways. First, the effective flow area of first nozzle 18 is increased. Because first needle 48 is tapered, moving flow control device 22 to the left increases the area through which fuel can flow through first throat 42. Second, the effective flow of second nozzle 20 is decreased, increasing the back pressure at fuel inlet 14 and forcing more fuel to flow through first nozzle 18. Opposite that of first nozzle 18, moving flow control device 22 to the left decreases the area through which fuel can flow through second throat 60 of second nozzle 20. Since flow through second nozzle 20 is constrained, the increased fuel back pressure directs additional fuel through first nozzle 18. Similarly, when the fuel flow command decreases and the fuel pressure and temperature initially remain constant, controller 32 instructs flow control device 22 to move to the right, restricting fuel flow through first nozzle 18 and increasing fuel flow through second nozzle 20 to fuel bypass 26 thereby reducing the pressure in central chamber 16.

By coupling fuel flow through first nozzle 18 and second nozzle 20 using flow control device 22, no additional differential pressure relief valve (PRV) is necessary to balance fuel flowing through fuel flow control system 10. Instead, flow control device 22 is constructed and tapered in such a way that the fuel needed by engine system 24 is metered through first nozzle 18 and the flow through second nozzle 20 to fuel bypass 26 automatically compensates for the flow through first nozzle 18 and maintains the proper pressure drop between central chamber 16 and fuel bypass 26. Eliminating the conventional differential PRV from fuel flow control system 10 improves the accuracy of fuel delivered to engine system 24 by eliminating the errors introduced by PRVs and also reduces the complexity and cost of the system.

Additionally, fuel flow control system 10 automatically compensates for any differences between new, old or worn fuel pumps. Old and worn fuel pumps 12 do not deliver fuel as efficiently or at as high of a pressure as a new fuel pump. Since controller 32 bases the position of flow control needle 22 on the incoming fuel pressure within central chamber 16 or at nozzle entrance 40, the condition of fuel pump 12 (new, worn or old) is automatically taken into account. In some cases, conventional fuel metering systems based operation of the metering valve and the differential PRV on values obtained for a partly worn pump (e.g., a 30% degraded pump), introducing inaccuracies into the fuel metering operation for pumps that are degraded to a lesser or greater degree. Fuel flow control system 10 eliminates these problems.

Exemplary embodiments of fuel flow control system 10 include servo valve 34, piston 36 and linear variable differential transformer (LVDT) 38. In one embodiment, servo valve 34 is a single stage servo valve (SSSV). As shown in FIG. 1, piston 36 is secured to second needle 54 of flow control device 22 by rod 37. Controller 32 commands a current to servo valve 34, which positions piston 36. Servo valve 34 controls the axial position of piston 36, which in turn controls the position of flow control device 22. Rod 37 may also prevent rotation of flow control device 22. Linear variable differential transformer 38 includes rod 39 secured to piston 36 to reciprocate therewith. As LVDT 38 is connected to flow control device 22, LVDT 38 generates an electrical signal indicative of the position of flow control device 22. Together, servo valve 34, piston 36 and LVDT 38 allow for precise control of the position of flow control device 22 by controller 32.

In exemplary embodiments, first nozzle 18 and second nozzle 20 are critical flow nozzles. Critical flow nozzles operate by accelerating the flow of a liquid to the maximum possible velocity before the pressure drops to the fluid's vapor pressure. Transition from a liquid to a vapor (boiling) is prevented by the presence of a metal constraint (first throat 42) which creates a choked flow. The tapered recovery zone (pressure recovery zone 44) decreases the fluid speed and allows pressure to be regained. Fluid dynamics principles dictate that a fluid's velocity must increase as the fluid passes through a constriction to satisfy the principle of continuity, while the fluid's pressure must decrease to satisfy the principle of conservation of mechanical energy.

When the fuel flows through first nozzle 18 at choked flow conditions, first nozzle 18 can act as a flow meter capable of eliminating the need for downstream flow meters. Flow meters, such as torque angle flow meters, are often employed downstream of a fuel metering unit to validate or serve as a double check for the liquid level gauges in the fuel tank(s). Torque angle flow meters cannot always accurately measure the flow of fuel. However, when fuel is flowing through first nozzle 18 at critical flow conditions, the amount of fuel flow can be calculated based on the fuel pressure (pressure transducer 28), fuel temperature (temperature sensor 30) and flow area (determined by the location of flow control needle 22 and the taper profile of first needle 48). Similarly, second nozzle 20 can also be used to monitor the amount of flow being sent to fuel bypass 26. By acting as flow meters, first nozzle 18 and second nozzle 20 can also identify when fuel pump 12 is deteriorating or not functioning ideally. Removing the need for additional flow meters within fuel flow control system 10 further reduces the costs and complexity of the system.

Additionally, critical flow nozzles also act as segmental flow dividers at above idle flows. Variable flow nozzles act to create reduced burn flow zones at idle and sub idle flows thereby setting up standing pressure zones in the high flow fixed nozzle areas and preventing burner howling from rotational plenum air flows.

Figure 4:
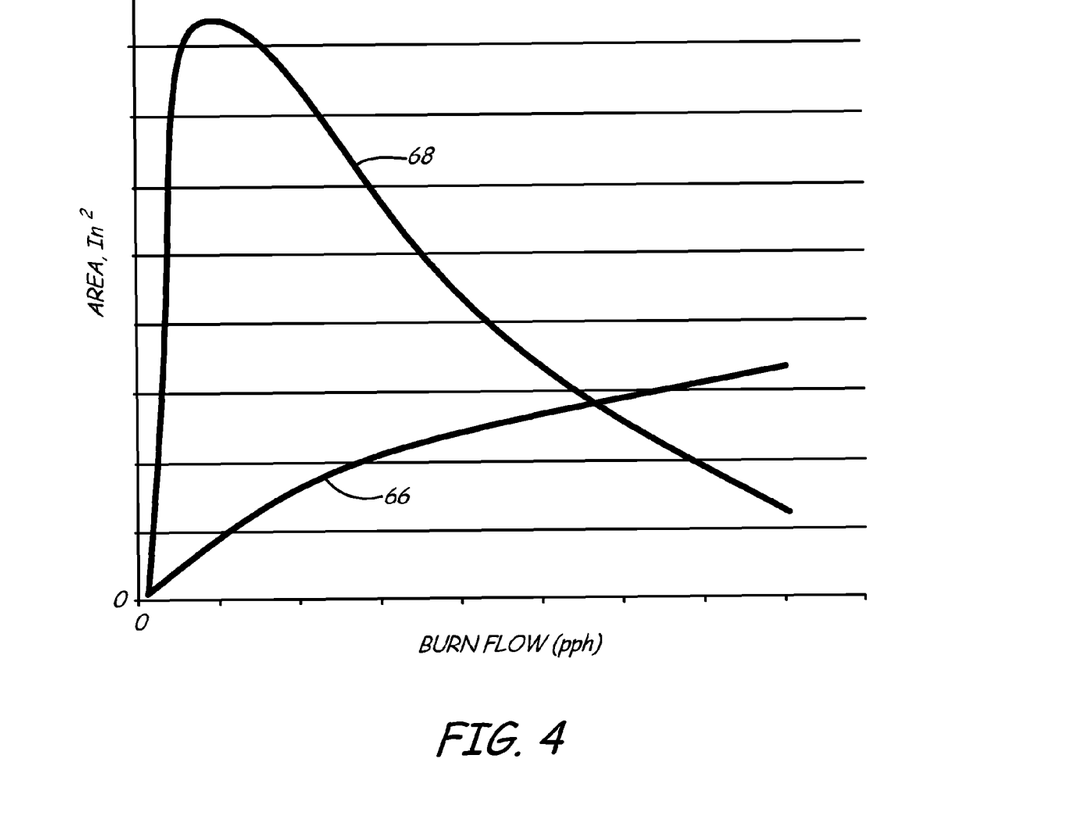
FIG. 4 is a graph demonstrating the general relationship between engine fuel flow and bypass flow.

Fuel flow control system 10 operates based on the understanding that engine fuel flow (through first nozzle 18) and bypass fuel flow (through second nozzle 20) are generally inversely proportional. FIG. 4 illustrates the relationship between the flow areas (y-axis) of the engine flow (curve 66) and the bypass flow (curve 68) at different burn rates (x-axis). For the majority of the values shown, as engine flow area increases, bypass flow area decreases. The only exception is observed at low burn rates, generally experienced at engine startup. During these conditions, the flow areas of engine flow and bypass flow diverge. In exemplary embodiments of fuel flow control system 10, fuel bypass 26 includes valve 70. Valve 70 is closed during engine startup to prevent flow through fuel bypass 26 so that all fuel entering central chamber 16 is delivered through first nozzle 18 regardless of the position of flow control needle 22. Once the engine has started and the burn rate has passed the apex of bypass flow curve 68 in FIG. 4, valve 70 is opened and the flow of fuel through second nozzle 20 and fuel bypass 26 is controlled by flow control needle 22 as described above.

In exemplary embodiments, the bimodal nature of the start flow regime (engine startup) can be satisfied by placing check valve 70 in fuel bypass 26. In one embodiment, check valve 70 has a cracking pressure of about 100 PSID. Check valve 70 acts like a temporary back pressure regulator at low start flows and pressures thereby diverting the initial flow of fuel through first nozzle 18 to the burner to satisfy "light-off" conditions near the ignitors. Once burn flow is ignited, the increased pump flow drives the system to a unimodal state as check valve 70 remains open for the rest of the engine cycle. At low flows and chamber pressures first nozzle 18 will not be "critical" and will function simply as a conventional orifice.

Figure 5:
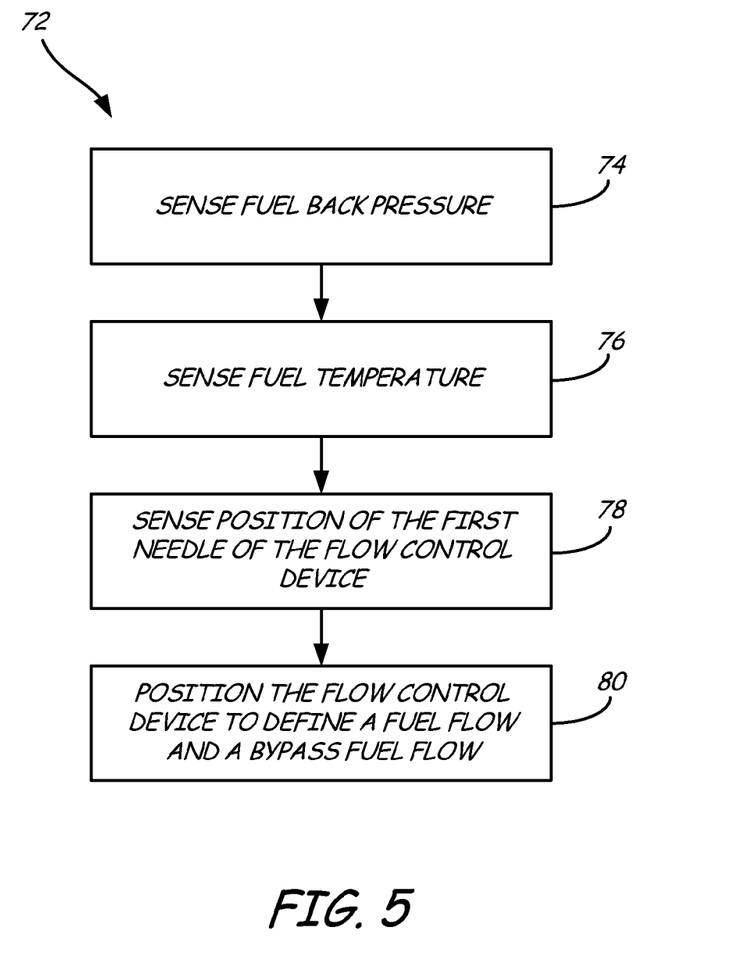
FIG. 5 is a simplified flow diagram of a method for metering fuel using the fuel flow control device of FIG. 1.

Fuel flow control system 10 provides a method for metering flow of fuel to an engine using a flow control device having a first needle with a first tapered portion slidably positioned within a first nozzle and a second needle with a second tapered portion slidably positioned within a second nozzle. FIG. 5 illustrates one embodiment of method 72 for metering fuel flow. Method 72 includes sensing a fuel back pressure in the flow control device (step 74), sensing a fuel temperature (step 76) and sensing a position of first needle 48 with respect to first nozzle 18 (step 78). Method 72 also includes positioning flow control device 22 so that the first tapered portion is located within the first nozzle to define a fuel flow and the second tapered portion is simultaneously located within the second nozzle to define a bypass fuel flow (step 80). First needle 48 of flow control device 22 is positioned inside a bore of first nozzle 18 to define a flow area of first nozzle 18 to regulate fuel flow to the engine based on the fuel back pressure and the fuel temperature. Second needle 54 of flow control device 22 is simultaneously positioned inside a bore of second nozzle 20 to define a flow area of second nozzle 20 to regulate bypass fuel flow.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A fluid flow control system comprising:
   a fluid inlet;
   a central chamber;
   a first nozzle extending from a first side of the central chamber, the first nozzle comprising a first throat;
   a second nozzle extending from a second side of the central chamber opposite the first side, the second nozzle comprising a second throat, wherein the first nozzle and the second nozzle are critical flow nozzles; and
   a flow control shuttle comprising:
      a first needle having a first tapered portion positioned within the first throat for controlling flow through the first nozzle; and
      a second needle having a second tapered portion positioned within the second throat for controlling flow through the second nozzle.

2. The system of claim 1, wherein the flow control shuttle is a one-piece assembly.

3. The system of claim 1, wherein movement of the flow control shuttle controls flow through the first nozzle and the second nozzle simultaneously.

4. The system of claim 1, wherein the first throat has a diameter different from that of the second throat.

5. The system of claim 1, wherein the first tapered portion has a profile different from that of the second tapered portion.

6. A fluid flow control system comprising:
   a fluid inlet;
   a central chamber;
   a first nozzle extending from a first side of the central chamber, the first nozzle comprising a first throat;
   a second nozzle extending from a second side of the central chamber opposite the first side, the second nozzle comprising a second throat;
   a flow control shuttle comprising:
      a first needle having a first tapered portion positioned within the first throat for controlling flow through the first nozzle; and
      a second needle having a second tapered portion positioned within the second throat for controlling flow through the second nozzle;
   a pressure transducer for monitoring pressure within the central chamber;
   a temperature sensor for monitoring temperature of fluid entering through the fluid inlet; and
   a controller for positioning the flow control shuttle so that the first tapered portion controls flow through the first nozzle based on the pressure and the temperature within the central chamber.

7. The system of claim 6, further comprising:
   a servo valve; and
   a piston connected to one of the first needle or the second needle for positioning the flow control shuttle, wherein the servo valve controls movement of the piston, and wherein the controller positions the flow control shuttle using the servo valve and the piston.

8. The system of claim 6, further comprising a linear variable differential transformer, wherein the linear variable differential transformer measures the location of the flow control shuttle.

9. The system of claim 1, wherein the first nozzle is in communication with an engine system and the second nozzle is in communication with a fuel bypass.

10. The system of claim 1, further comprising:
a bypass line in communication with the second nozzle comprising a valve for restricting fluid flow through the bypass line regardless of the position of the flow control shuttle.

11. A fuel metering system comprising:
a fuel inlet;
a central chamber;
a first critical flow nozzle extending from a fuel delivery side of the central chamber, the first critical flow nozzle comprising a first throat;
a second critical flow nozzle extending from a bypass side of the central chamber opposite the fuel delivery side, the second critical flow nozzle comprising a second throat; and
a flow control device comprising:
   a first needle having a first tapered portion for modifying flow through the first nozzle; and
   a second needle having a second tapered portion for simultaneously modifying flow through the second nozzle.

12. The fuel metering system of claim 11, wherein the flow control device is a one-piece assembly.

13. The fuel metering system of claim 11, wherein the flow control device modifies flow through the first nozzle and the second nozzle simultaneously.

14. The fuel metering system of claim 11, further comprising:
a pressure transducer for monitoring fuel pressure within the central chamber;
a temperature sensor for monitoring temperature of fuel entering through the fuel inlet; and
a controller for positioning the flow control device so that the first tapered portion modifies flow through the first nozzle based on the fuel pressure and the fuel temperature within the central chamber.

15. A method for metering flow of fuel to an engine using a flow control device having a first needle with a first tapered portion slidably positioned within a first critical flow nozzle and a second needle with a second tapered portion slidably positioned within a second critical flow nozzle, the method comprising:
sensing a fuel back pressure;
sensing a fuel temperature;
sensing a position of the first needle of the flow control device with respect to the first critical flow nozzle; and
positioning the flow control device so that the first tapered portion is located within a first throat of the first critical flow nozzle to define a first fuel flow and the second tapered portion is simultaneously located within a second throat of the second critical flow nozzle to define a bypass fuel flow, wherein the first critical flow nozzle is located on a first side of a central chamber and the second critical flow nozzle is located on a second side of the central chamber.

16. The method of claim 15, wherein the tapered flow control device is a one-piece assembly.

17. The method of claim 15, wherein the first critical flow nozzle comprises the first throat having a first diameter and the second critical flow nozzle comprises the second throat having a second diameter different from the first diameter, and wherein the first tapered portion and the second tapered portion have different taper profiles.

18. The method of claim 15, wherein the flow control device is positioned using a servo valve, a piston and a linear variable differential transformer.

* * * * *